Oct. 18, 1960 C. WILLIAMSON 2,956,753
CLAY MIXER AND BLUNGER
Filed Dec. 12, 1958 2 Sheets-Sheet 1

INVENTOR.
CORBETT WILLIAMSON
BY
ATTORNEYS

Oct. 18, 1960  C. WILLIAMSON  2,956,753
CLAY MIXER AND BLUNGER
Filed Dec. 12, 1958  2 Sheets-Sheet 2
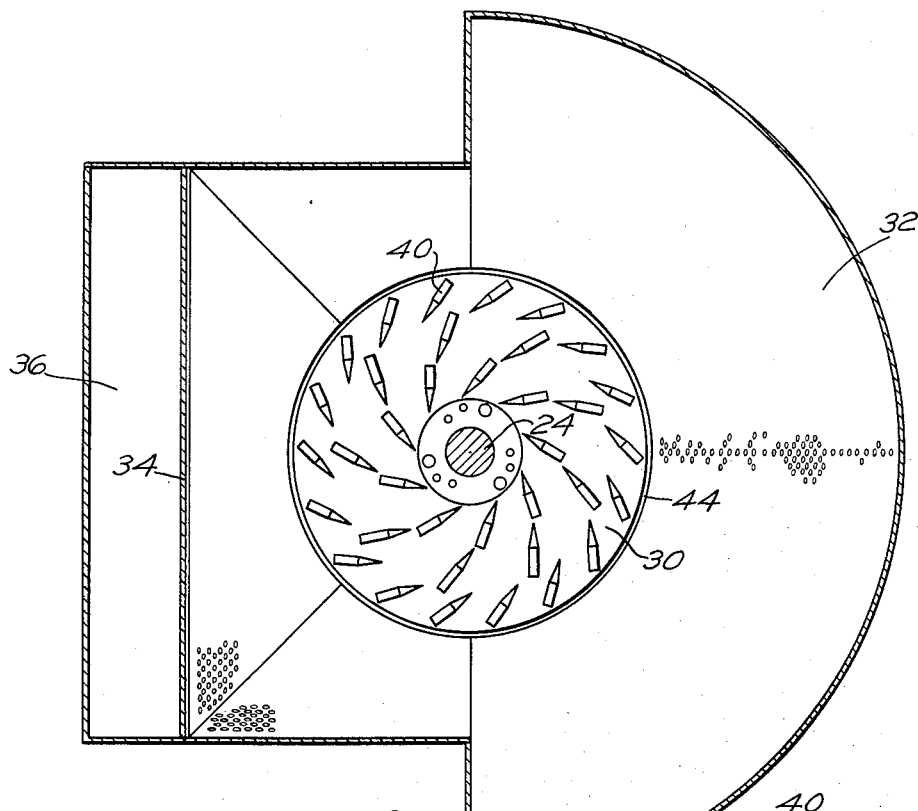
FIG. 2
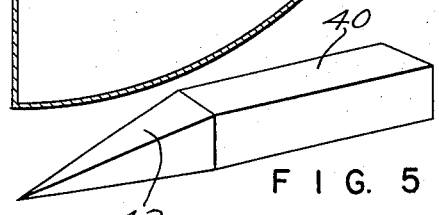
FIG. 5
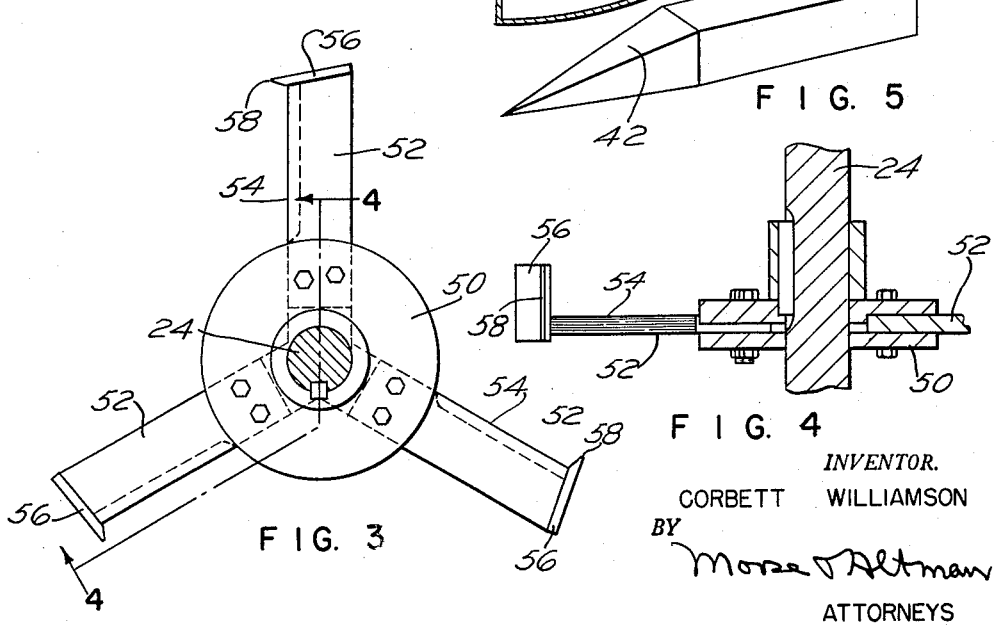
FIG. 3
FIG. 4
INVENTOR.
CORBETT WILLIAMSON
BY
Morse J Altman
ATTORNEYS

United States Patent Office 2,956,753
Patented Oct. 18, 1960

2,956,753
CLAY MIXER AND BLUNGER

Corbett Williamson, Macon, Ga., assignor to Georgia Kaolin Company, Dry Branch, Ga., a corporation of New Jersey Filed Dec. 12, 1958, Ser. No. 779,950

2 Claims. (Cl. 241—46)

This invention relates to apparatus for operating on crude clay as received from excavational units to reduce the clay to a slurry. Crude clay when taken from a pit-face is usually obtained in chunks which must be disintegrated in water to form a slurry for further treatments. As this initial operation of reducing crude clay to a slurry is a well-nigh universal necessity, many efforts have been made in the past to provide methods and mechanism for blunging crude clay as quickly and economically as possible. The many various mechanisms heretofore employed for this purpose have been subject to various operational difficulties owing to the fact that crude clay from the pit-face is usually supplied in the form of chunks which are compact and do not easily disintegrate. Furthermore, when drag-lines or power shovels are employed in mining the clay, the clay is supplied to the blunging apparatus intermittently with the result that the apparatus is apt to be frequently overloaded, thus materially shortening its useful life. It is an object of the invention to provide an apparatus which will blunge crude clay lumps more rapidly and with less power consumption than heretofore. It is a further object of the invention to carry on the blunging operation at a substantially uniform rate in spite of an intermittent supply of crude clay from a power shovel or the like. Another object of the invention is to avoid the imposition of sudden shock loads on the rotating parts of the apparatus. Other advantageous and beneficial results are had from the apparatus hereinafter described.

According to the present invention, a two-stage blunging mechanism is provided, including a hopper adapted to receive the contents of a dipper or shovel bucket without shock to the rotating parts of the apparatus. The lumps of clay in the hopper are rapidly shaved in a pool of water in the hopper to reduce the large lumps to a slurry which may include some small lumps. This slurry is strongly agitated by a rotary disintegrator which operates to complete the blunging operation by breaking up the small lumps which come from the first stage of treatment.

For a more complete understanding of the invention reference may be had to the following description thereof, and to the drawing, of which:

Figure 2 is a section, on the line 2—2 of Figure 1, on a larger scale;

Figure 3 is a section on the line 3—3 of Figure 1, on a larger scale;

Figure 4 is a section on the line 4—4 of Figure 3; and

Figure 5 is a perspective view, on a larger scale, of one of the shaving knives shown in Figure 2.

Figure 1:
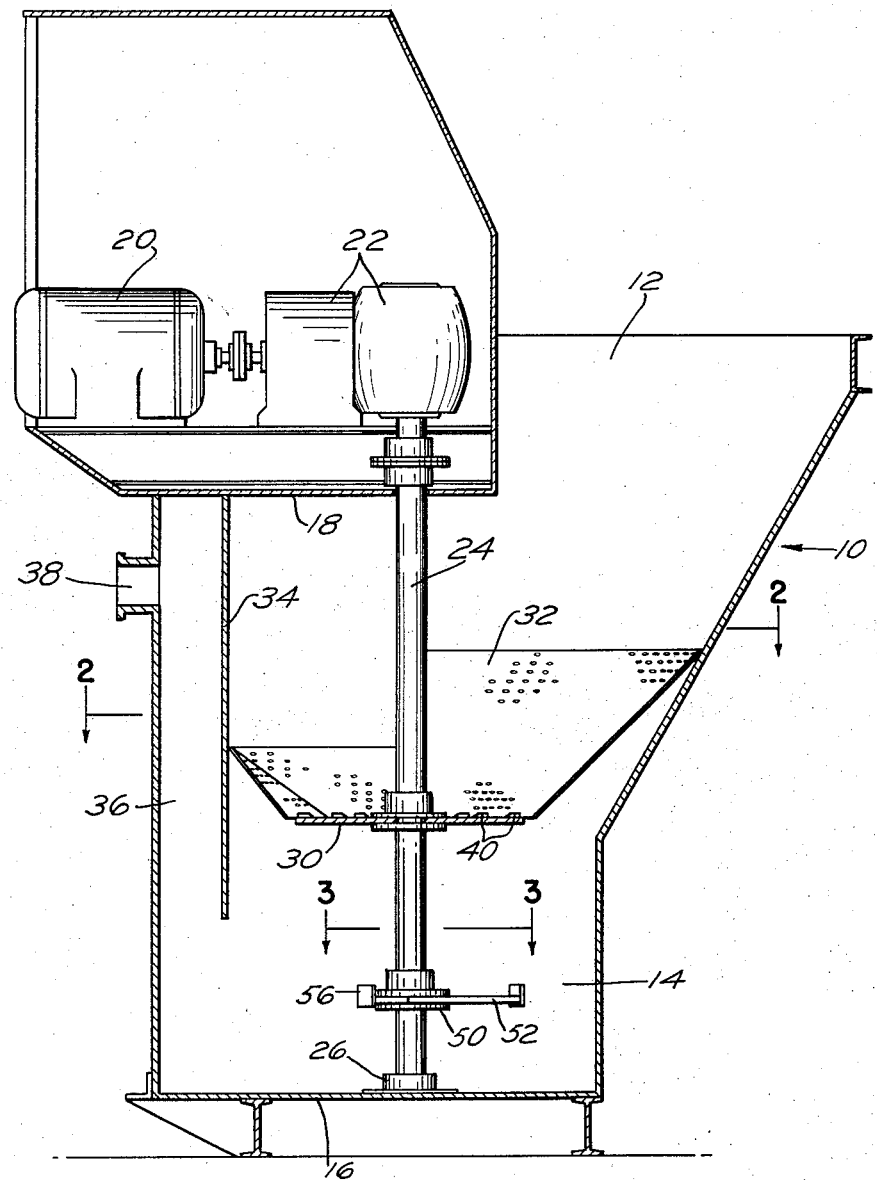
Figure 1 is a sectional view, on a vertical plane, of apparatus embodying the invention.

As shown in Figure 1, the mechanism comprises a tank 10 which can be of any convenient shape but preferably has a flaring upper portion forming a hopper 12 to receive lumps of crude clay from an excavating mechanism. As shown, the hopper 12 is partly rectangular and partly frusto-conical. The lower portion 14 of the tank is partly rectangular and partly cylindrical. The walls of the tank, together with the bottom 16 thereof and an elevated platform 18 form a framework on which is supported an electric motor 20. This is connected through suitable reduction gearing 22 to a vertical shaft 24 which is suspended from suitable bearings (not shown) within the housing which contains the speed reduction gearing. A guide bearing 26 is provided on the bottom 16 of the tank to prevent lateral oscillation of the shaft.

A horizontal disk 30 is mounted on the shaft 24 at a point spaced above the lower end thereof, this being approximately on a level with the top of the semi-cylindrical container 14. An inclined wall 32 slopes outwardly and upwardly from near the periphery of the disk 30 toward the walls of the tank 10.

Within the rectangular portion of the tank 10, a partition member 34 extends down from the platform 18 to a point materially lower than the level of the disk 30. This partition forms a discharge passage 36 extending upward from the lower compartment 14 to a discharge outlet 38 which is well above the level of the disk 30. When water is supplied to the tank 10, the perforated wall 32 is submerged.

Mounted on the upper face of the disk 30 are a number of shaving knives 40, one of which is illustrated on a larger scale in Figure 5. These knives are rectangular blocks of steel with sharp right-angled edges, each block having a tapering portion 42 of pyramidal shape ending in a point. The bottom face of the tapered end portion is in the same plane with the bottom face of the rectangular portion of the block so that the block and its tapered portion bears directly from end to end on the disk 30. As indicated in Figure 2, these shaving knives are arranged in circular series on the top face of the disk 30, each knife being at an angle to the radius from the shaft 24. During the operation of the apparatus, the knives are submerged in a pool of water which extends up to the level of the discharge outlet 38 and thus covers the disk and all of the perforated wall 32. When lumps of crude clay are dumped into the hopper 12, they sink to the bottom of the hopper and some of them rest on the rotating disk 30. As the disk rotates the shaving knives 40 rapidly scrape under water the bottom surfaces of the chunks of clay on the disk, the shavings being mixed with the adjacent water and pushed outward toward the periphery of the disk by the angular arrangement of the knives 40 which have a centrifugal pumping effect. At the periphery of the disk is a narrow clearance 44 through which some of the shavings may pass downward into the pool in the lower compartment 40. Other shavings pass through one or another of the perforations in the perforated wall 32. These shavings consist of a slurry containing small lumps of clay together with a certain amount of thoroughly disintegrated clay.

To disintegrate the small lumps shaved from the large chunks an agitator 50 is mounted in the lower compartment 14 on the shaft 24 to rotate therewith. This agitator comprises one or more radially extending arms 52, three such arms being shown in Fig. 3. As shown, each of the arms 52 is a flat blade in a horizontal plane, each blade having a sharpened leading edge 54. At the outer end of each arm 52 is a vertical blade 56 with a sharpened leading edge 58. As indicated in Figure 3, the end blades are not tangential to their circular path of motion but toe inward so that as the agitator revolves in a counterclockwise direction, an outward flow of slurry is produced by the inclination of the blades 56 to the radii from the shaft 24. The arms 54 and their terminal blades 56 rotate rapidly with the shaft 24 and operate much like a Dover eggbeater, disintegrating the small lumps of clay which come down through the clearance 44 and the perforations of the perforated wall 32. The currents set up in the slurry by the arms and blades also produce a violent swirling agitation of the slurry within the lower compartment 14, such agitation helping by hydraulic friction to complete the distintegration of the small lumps of clay which come into the lower compartment from the hopper above. As crude clay is fed into the hopper, corresponding amounts of water and chemical are also fed into the hopper by automatically controlled means (not shown). The addition of crude clay and water maintains a constant flow of slurry through the clearance 44 and perforations into the lower compartment and out through the discharge passage 36 and outlet 38.

The provision of a hopper of considerable capacity with a shaving device at its bottom results in the delivery of slurry at a substantially constant rate even when quantities of crude clay are dumped intermittently into the hopper by a drag-line dipper or power shovel. Thus the load on the rotating mechanism is constant and relatively light. The load on the agitator 50 is also substantially constant so that the rotating mechanism is not subjected to any sudden shocks or load increases and the disintegration of the chunks of crude clay into a slurry is more rapid and complete than has been possible by the use of previous kinds of apparatus.

I claim:

1. Mechanism for reducing lumps of crude clay to a slurry, comprising a tank, a shaft supported in said tank for rotation about a vertical axis, agitator means mounted on said shaft near the bottom of the tank for rotation therewith, a disk mounted on said shaft in a horizontal plane spaced above said agitation means, shaving knives on said disk, a fixed perforated wall surrounding said disk and extending upward and outward from near the rim thereof, said tank having a discharge outlet at a higher level than said perforated wall, and means for rotating said shaft, disk and agitator means.

2. Mechanism for blunging crude clay, which comprises a tank, a vertical shaft rotatably supported in said tank, a plurality of arms projecting laterally from said shaft near the lower end thereof, a vertical stirrer blade on the outer end of each said arm mounted in vertical plane making an acute angle with the radius from said shaft, a disk mounted on said shaft in a horizontal plane spaced above said arms, a plurality of shaving knives on the upper face of said disk, a fixed perforated wall surrounding said disk and extending upward and outward from near the rim thereof dividing said container into lower and upper compartments, and a discharge duct leading from the lower compartment to a level higher than said perforated wall.

References Cited in the file of this patent

UNITED STATES PATENTS

| | | |
|---|---|---|
| 677,702 | Russell | July 2, 1901 |
| 2,661,666 | Knoll | Dec. 8, 1953 |
| 2,665,853 | Nicholson | Jan. 12, 1954 |
| 2,672,075 | Fraser | Mar. 16, 1954 |
| 2,674,927 | Wicksell | Apr. 13, 1954 |
| 2,780,417 | Harris | Feb. 5, 1957 |
| 2,796,807 | Sanford | June 25, 1957 |